(12) United States Patent
Kamen et al.

(10) Patent No.: US 9,569,009 B2
(45) Date of Patent: Feb. 14, 2017

(54) MULTIMEDIA INTERACTIVE DEVICE FUNCTION SELECTION BASED UPON BUTTON DEPRESSION DURATION

(75) Inventors: Yakov Kamen, Cupertino, CA (US); Dan Kikinis, Saratoga, CA (US)

(73) Assignee: JLB Ventures LLC, Washington, DC (US)

( * ) Notice: Subject to any disclaimer, the term of this patent is extended or adjusted under 35 U.S.C. 154(b) by 4576 days.

(21) Appl. No.: 10/087,975

(22) Filed: Mar. 1, 2002

(65) Prior Publication Data

US 2002/0122079 A1 Sep. 5, 2002

Related U.S. Application Data

(60) Provisional application No. 60/273,103, filed on Mar. 2, 2001.

(51) Int. Cl.

| | |
|---|---|
| H04N 5/44 | (2011.01) |
| H04N 7/173 | (2011.01) |
| H04N 7/16 | (2011.01) |
| G06F 3/023 | (2006.01) |
| G06F 3/0489 | (2013.01) |
| H04N 5/445 | (2011.01) |
| H04N 21/422 | (2011.01) |

(52) U.S. Cl.
CPC ........... *G06F 3/0236* (2013.01); *G06F 3/0238* (2013.01); *G06F 3/0489* (2013.01); *H04N 5/44543* (2013.01); *H04N 5/44582* (2013.01); *H04N 21/42215* (2013.01); *H04N 2005/4421* (2013.01)

(58) Field of Classification Search
USPC .................................................. 725/39, 50
See application file for complete search history.

(56) References Cited

U.S. PATENT DOCUMENTS

| | | | | |
|---|---|---|---|---|
| 4,052,799 A | * | 10/1977 | Journot .......................... 434/362 |
| 4,621,259 A | | 11/1986 | Schepers et al. .............. 345/180 |
| 5,020,139 A | * | 5/1991 | Keenan ....................... 455/151.2 |
| 5,243,418 A | | 9/1993 | Kuno et al. ................... 348/155 |
| 5,317,403 A | * | 5/1994 | Keenan ........................... 725/38 |
| 5,412,377 A | * | 5/1995 | Evans et al. ................. 340/4.35 |

(Continued)

FOREIGN PATENT DOCUMENTS

| | | |
|---|---|---|
| JP | 410093880 A | 4/1998 |
| WO | WO 00/01149 A1 | 1/2000 |

*Primary Examiner* — Nasser Goodarzi
*Assistant Examiner* — Fred Peng
(74) *Attorney, Agent, or Firm* — Banner & Witcoff, Ltd.

(57) ABSTRACT

A method and apparatus wherein a plurality of functions are implemented on a multimedia presentation device. A user can access several of the functions by depressing a single button. A particular function is specified by the duration of the button depression. For one embodiment the functions affect a favorite program list and allow a user to access the list, update the list, and delete entries from the list depending upon button depression duration. For example, the user may depress button number (#) 3 of a remote control device. A brief depression (e.g., less than 1 second), results in the remote control interpreting this click as a digit for selecting a channel, and the system will tune to channel #3. A longer depression (e.g., between 1 and 2 seconds), results in the system recalling previously programmed selection #3. Likewise, other functions are implemented by depression the button for various durations.

21 Claims, 6 Drawing Sheets

(56) References Cited

U.S. PATENT DOCUMENTS

| | | | |
|---|---|---|---|
| 5,414,773 A | 5/1995 | Handelman | 725/117 |
| 5,479,268 A | 12/1995 | Young et al. | 386/83 |
| 5,485,197 A | 1/1996 | Hoarty | 725/37 |
| 5,526,034 A | 6/1996 | Hoarty | |
| 5,532,754 A | 7/1996 | Young et al. | 725/47 |
| 5,550,576 A | 8/1996 | Klosterman | 725/46 |
| 5,550,578 A | 8/1996 | Hoarty | |
| 5,684,525 A | 11/1997 | Klosterman | 725/48 |
| 5,704,837 A | 1/1998 | Iwasaki et al. | 463/38 |
| 5,724,492 A | 3/1998 | Matthews, III et al. | 345/419 |
| 5,737,028 A | 4/1998 | Bertram et al. | 725/37 |
| 5,751,282 A | 5/1998 | Girard et al. | 715/721 |
| 5,808,613 A | 9/1998 | Marrin et al. | 715/850 |
| 5,818,441 A | 10/1998 | Throckmorton et al. | 715/717 |
| 5,828,945 A | 10/1998 | Klosterman | 455/42 |
| 5,841,563 A | 11/1998 | Effenberger | 348/533 |
| 5,844,620 A * | 12/1998 | Coleman et al. | 725/54 |
| 5,900,915 A | 5/1999 | Morrison | 725/44 |
| 5,923,362 A | 7/1999 | Klosterman | 725/48 |
| 5,926,168 A | 7/1999 | Fan | 344/158 |
| 5,929,849 A | 7/1999 | Kikinis | 725/113 |
| 5,940,073 A | 8/1999 | Klosterman et al. | 715/721 |
| 5,956,456 A | 9/1999 | Bang et al. | 386/83 |
| 5,977,964 A | 11/1999 | Williams et al. | 715/721 |
| 5,982,357 A * | 11/1999 | Burgett et al. | 345/168 |
| 5,999,167 A | 12/1999 | Marsh et al. | 345/158 |
| 5,999,187 A | 12/1999 | Dehmlow et al. | 345/420 |
| 6,002,403 A | 12/1999 | Sugiyama et al. | 715/717 |
| 6,029,195 A | 2/2000 | Herz | 725/116 |
| 6,034,678 A | 3/2000 | Hoarty | |
| 6,043,818 A | 3/2000 | Nakano et al. | 715/851 |
| 6,061,055 A | 5/2000 | Marks | 382/276 |
| 6,072,983 A | 6/2000 | Klosterman | 725/49 |
| 6,075,575 A | 6/2000 | Schein et al. | 348/734 |
| 6,078,348 A | 6/2000 | Klosterman et al. | 725/40 |
| 6,081,271 A | 6/2000 | Bardon et al. | 345/419 |
| 6,097,993 A * | 8/2000 | Skupin et al. | 700/240 |
| 6,100,883 A | 8/2000 | Hoarty | |
| 6,167,188 A | 12/2000 | Young et al. | 386/83 |
| 6,205,485 B1 | 3/2001 | Kikinis | 709/231 |
| 6,205,582 B1 | 3/2001 | Hoarty | |
| 6,233,389 B1 | 5/2001 | Barton et al. | 386/46 |
| 6,243,039 B1 | 6/2001 | Elliot | 342/457 |
| 6,271,831 B1 | 8/2001 | Escobosa et al. | 345/158 |
| 6,507,306 B1 * | 1/2003 | Griesau et al. | 341/176 |
| 6,757,906 B1 * | 6/2004 | Look et al. | 725/45 |
| 7,116,891 B2 * | 10/2006 | Borden, IV | 386/343 |
| 7,181,027 B1 * | 2/2007 | Shaffer et al. | 381/94.1 |
| 7,324,168 B2 * | 1/2008 | Griesau et al. | 348/734 |
| 2001/0005905 A1* | 6/2001 | Saib et al. | 725/57 |
| 2001/0007149 A1* | 7/2001 | Smith | 725/14 |
| 2002/0085090 A1* | 7/2002 | Kamen | 348/61 |
| 2002/0113895 A1* | 8/2002 | Takagi et al. | 348/569 |

* cited by examiner

MULTIMEDIA INTERACTIVE DEVICE FUNCTION SELECTION BASED UPON BUTTON DEPRESSION DURATION

CLAIM OF PRIORITY

This application is related to, and hereby claims the benefit, of provisional application Ser. No. 60/273,103, filed Mar. 2, 2001 and is hereby incorporated by reference.

FIELD OF THE INVENTION

The present invention relates generally to multimedia presentation devices and more specifically to methods and apparatuses for increased functionality of such devices and easier access thereto.

BACKGROUND OF THE INVENTION

Multimedia interactive presentation devices such as television viewing systems (e.g., Cable TV, digital TV, Satellite, and set top box) or personal video recorders (PVRs) typically provide limited functionality in some areas. Additionally, the functionality that is provided is often cumbersome difficult and/or time consuming to use.

For example, one problem facing viewers is how to peruse the vast number of available channels. A user might scroll through the hundreds of available channels to select a channel, but this may require an unacceptable amount of time (e.g., hours) just to complete one round of channel surfing.

Recent developments to aid searching for programs include an interactive program guide (IPG), which is now well known to those skilled in the art. Such IPGs may have features to aid the viewer in searches for programs of interest. Using an IPG, while somewhat more convenient, may require the viewer to go through multiple menu layers. The menus are provided by the system operator for searching future broadcasts. Typically a user may have to go through two or more menu layers to get to the point of searching. Then specific search information must be entered such as title, time, content, etc. This may require the user to input dozens of keystrokes. At this point the user may be several menu layers deeper. Not only may the user not wish to take the time and effort to do such complex navigation, but it often takes time to extricate oneself from the multiple layer menu.

Figure 1:
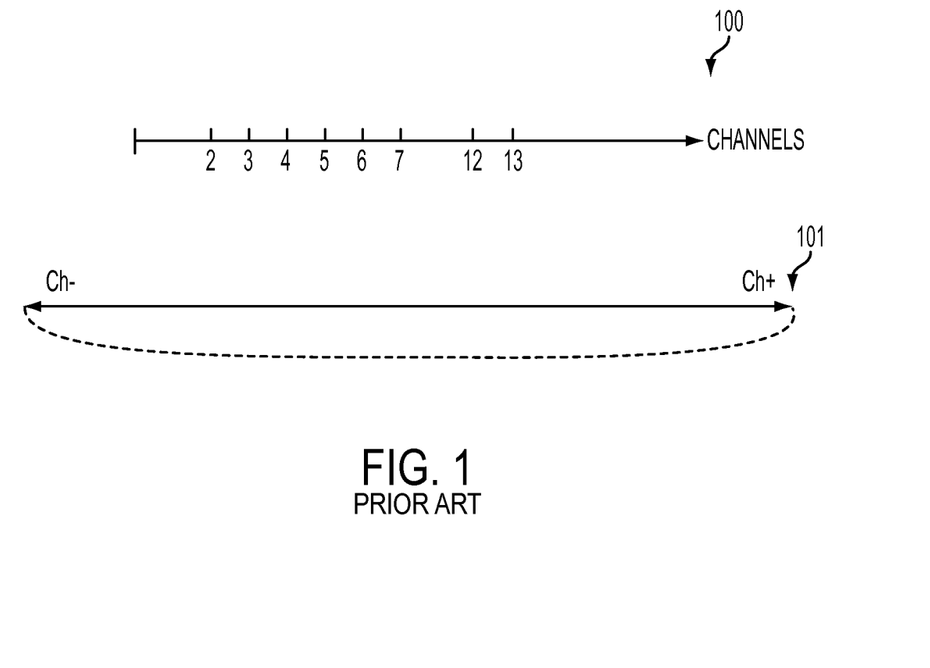
FIG. 1 shows a typical IPG channel line-up.

FIG. 1 shows a typical channel line-up 100, as would be displayed in an IPG (not shown) on a TV screen or similar display (also not shown). In this example, channels 1 through 7, 12, and 13 are available, so when the viewer presses the channel up and channel down buttons, which define a linear navigation scroll space 101 with multiple possible modes, he navigates among those channels in a linear manner. In some cases, the navigation wraps around from the last channel back to the first channel. However, as the number of available channels extends into the hundreds or even thousands (some satellite TV systems have now gone to four-digits channels, because they have used up their three-digit options) such a method for channel selection becomes very unwieldy.

Also available as a feature on some remote controls is a favorite channels list. To implement this feature, the viewer can, by using a special button on the remote control while browsing or viewing programs, select channels to be added as favorites. Then the viewer can roam just within those listed favorite channels. However, this may require the user to navigate through the multiple menu levels and then check a box for each desired channel. Such a favorite channels feature may also include a "last channel" button to allow the user to return to the immediate previous favorite channel. For example, for a favorite channel list having ten preferred channels, if the user is at number 6 in their list, the last channel button will return them to favorite channel number 5. However to go back to favorite channel number 4, the user will typically have to move forward through the list of favorites (e.g., through numbers 7, 8, and 9,) and then progress from zero to number 4. Such limitations on functionality are time-consuming and annoying.

What is needed is an easier and more intuitive way for the viewer to access available functionality to navigate more efficiently among the multitude of channel and/or program selections.

SUMMARY OF THE INVENTION

A method and apparatus wherein a plurality of functions are implemented on a multimedia presentation device. A user can access several of the functions by depressing a single button. A particular function is specified by the duration of the button depression. For one embodiment the functions affect a favorite program list and allow a user to access the list, update the list, and delete entries from the list depending upon button depression duration.

Other features and advantages of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

An embodiment of the present invention allows a viewer of a multimedia presentation system to select from multiple system functions by depressing a single button on a control device. A specific function is selected based upon the time the button is depressed. For one embodiment, a function expected to be used less frequently corresponds to a shorter button depression duration than a function expected to be used more frequently. For one embodiment, the user may select from multiple functions affecting a favorite channels list. For example, the user may depress button number (#) 3 of a remote control device. If the user depresses the button briefly (e.g., less than 1 second), then the remote control interprets this click as a digit for selecting a channel, and the system will tune to channel #3. If the user depresses the button for a longer period (e.g., between 1 and 2 seconds), then the system recalls previously programmed selection #3 (selection 3 of a favorite channel list). Likewise, other functions are implemented by depressing the button for various durations.

In the following detailed description of the present invention, explanation and reference are directed toward an embodiment of the present invention providing multiple functions affecting a favorite channels list. Alternative embodiments of the present invention have applications directed toward other functions of a multimedia presentation system. Additionally, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 2:
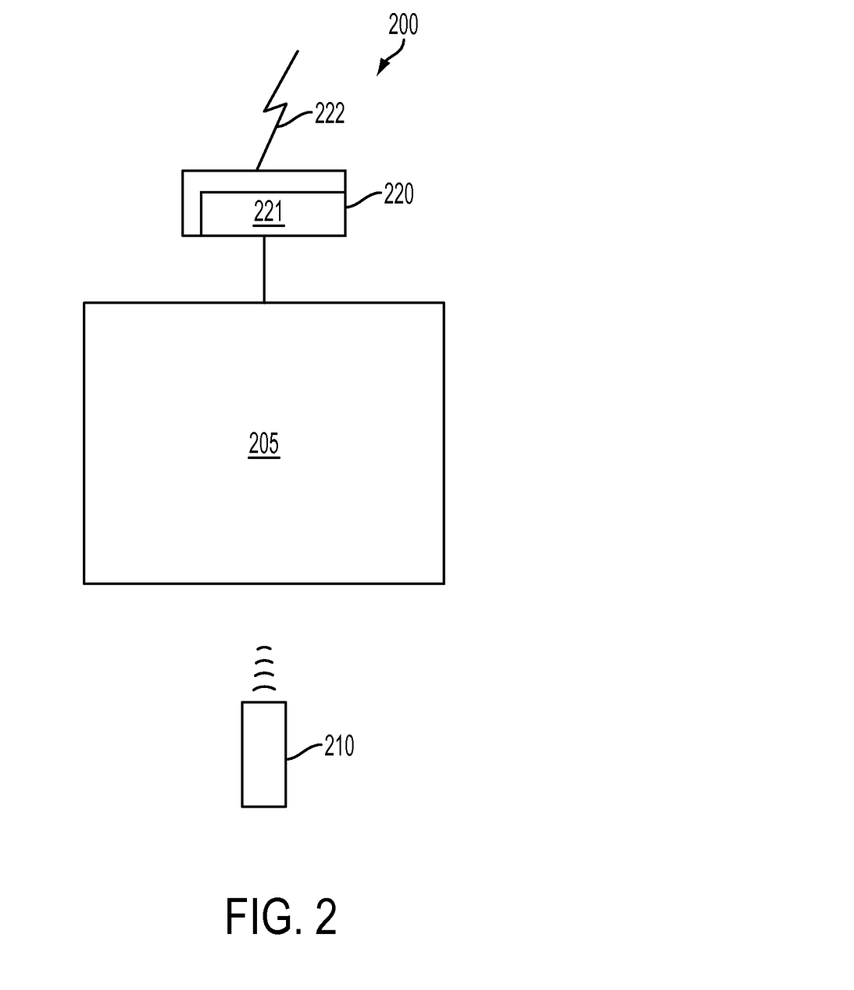
FIG. 2 illustrates a simplified block diagram of an exemplary multimedia presentation system for use with one embodiment of the present invention.

FIG. 2 illustrates a simplified block diagram of an exemplary multimedia presentation system for use with one embodiment of the present invention. System 200, shown in FIG. 2, includes a TV set 205 coupled to set-top box 220. Set-top box 220 may typically contain a processor and memory, the memory having software 221 stored upon it for implementing the present invention. Network connection 222 may be analog or digital cable, fiber optic, digital subscriber line (DSL), aerial, wireless cable, fiber, local multi-channel distribution systems (LMDS), etc., all of which are well-known in the art. System 200 also includes remote control 210, typically controlling the set-top box 220. In alternative embodiments, remote control 210 may be integrated with a TV, VCR, DVD player, or other presentation devices or combinations thereof.

Figure 3:
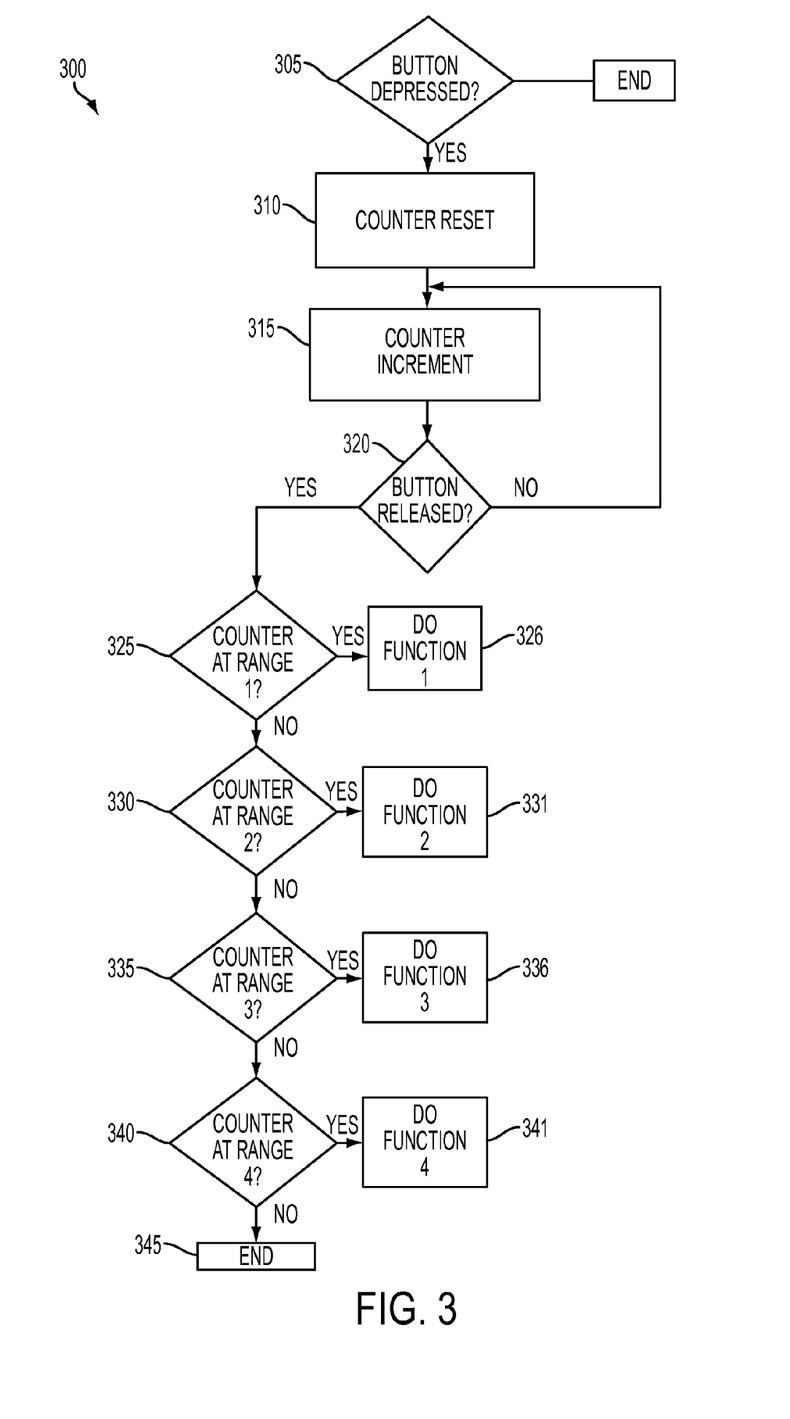
FIG. 3 illustrates implementation of a favorite channel list in accordance with one embodiment of the present invention.

FIG. 3 is a software process flow diagram in accordance with one embodiment of the present invention. Process 300, shown in FIG. 3, begins at operation 305 in which a button is depressed. The button may be incorporated within a multimedia presentation device, or may be on a remote control that controls such a device. At operation 310 a counter is reset. The counter may be implemented, in software or hardware, as a register having states that indicate consecutive numbers. At operation 315 the counter is incremented. At operation 320 an evaluation is made to determine if the button has been released, if not, then the counter is incremented again. This process is continued until the evaluation at operation 320 indicates that the button has been released. At operation 325 the counter is evaluated to determine if it is within a specified range, range 1. If so, the system implements function 1 at operation 326. If not, then evaluation of the counter continues. At operation 330 if the counter is within range 2 then function 2 results at operation 331. If not, at operation 335, if the counter is within range 3, then function 3 results, at operation 336 and so on. The number of selectable functions may be more or less than four. Additionally, at some point if the counter value is not within a range corresponding to a function, the process may terminate. For example, at operation 340, if the counter is within range 4 then function 4 results, at operation 341, and if not, the process is terminated at operation 345.

The operations described above in reference to FIG. 3 (evaluating button depression, incrementing a counter, evaluating a counter value, etc.) may be implemented by hardware and/or software contained within the viewer's set-top box 220. For example, a set-top box may include one or more processors that can execute code or instructions stored within a machine-readable medium that may also be included within the set-top box.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals.

Figure 4:
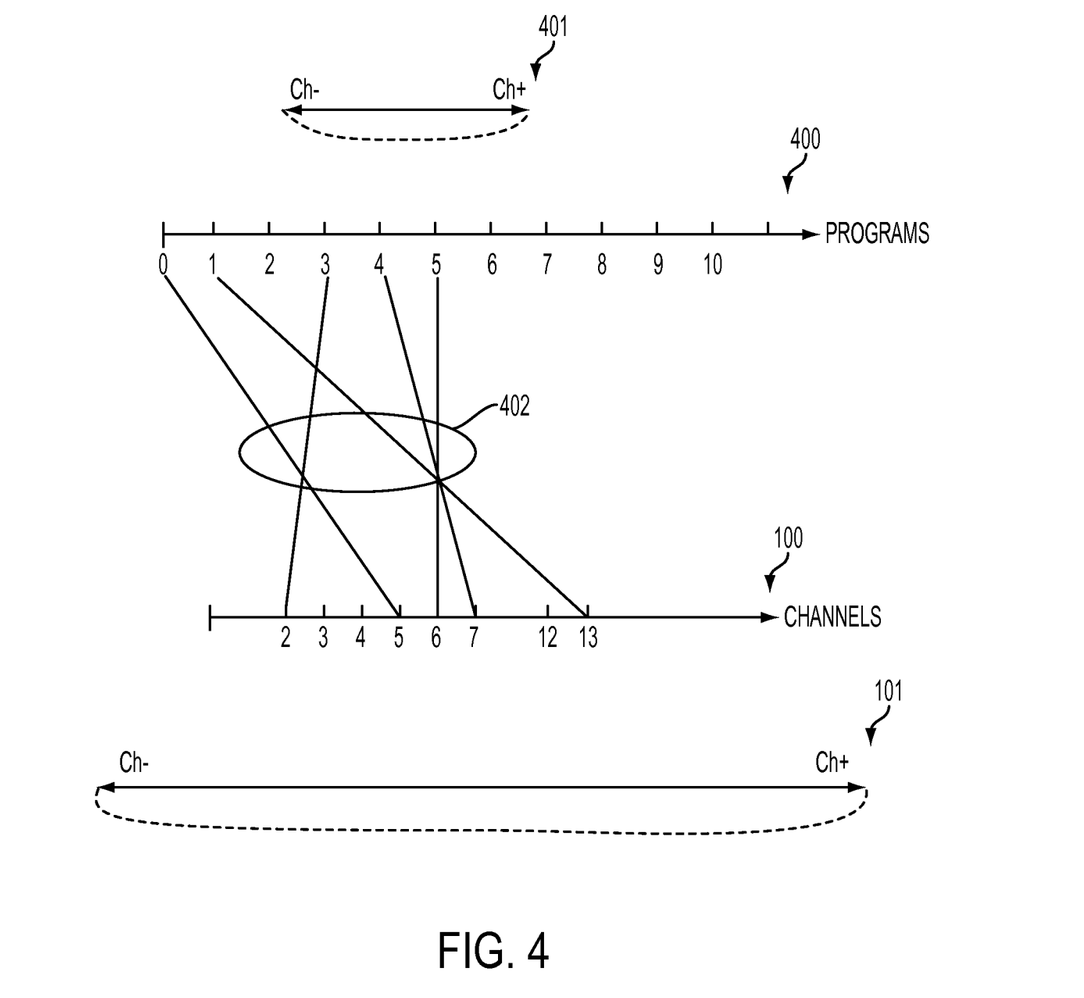
FIG. 4 illustrates button depression duration corresponding to function selection in accordance with one embodiment of the present invention.

FIG. 4 illustrates implementation of a favorite channel list in accordance with one embodiment of the present invention. In addition to channel lineup 100, a program lineup 400 is now also available. In this example, program lineup 400 comprises ten pre-settable program selections that are those programs of greatest interest to the viewer. These programs may be on any channels; there doesn't have to be a linear correlation between programs and channels. For example, as shown in FIG. 4, the first six of the ten pre-settable selections (0-5) have been programmed with channels 5, 13, 2, 7, and 6, respectively, as indicated by the correlation arrows 402.

For one embodiment the channel up (+) and channel down (−) buttons that define scroll space 101, may be used to navigate the program lineup 400, instead of in channel lineup 100. Alternatively, a user could press a single button to access his favorite programs, rather than enter two-, three-, or four-digit channel numbers. For example, a viewer could select his ten favorite channels, assign each of them to a program button, and then by pressing a single button, he would immediately be at his preferred channel.

Figure 5:
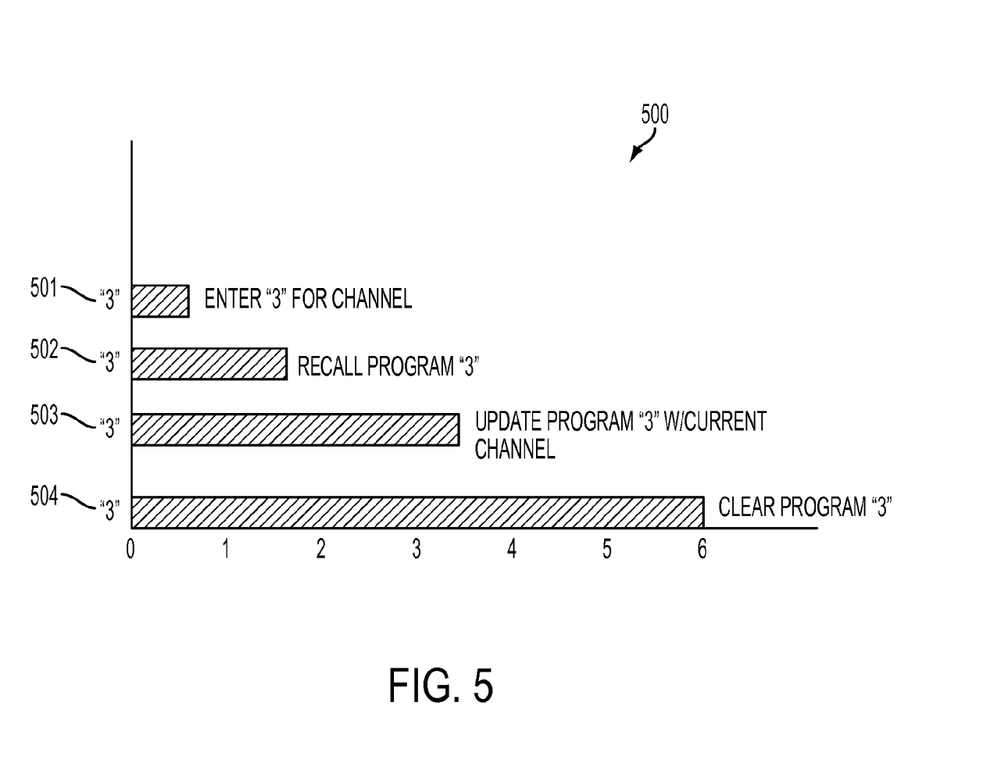
FIG. 5 illustrates button depression duration corresponding to function selection in accordance with one embodiment of the present invention.

FIG. 5 illustrates button depression duration corresponding to function selection in accordance with one embodiment of the present invention. With such an embodiment, a time-mode switch can be used to achieve single-button access to favorite programs. For example, the number buttons (0-9) can be used to select channels, or programs, or other video selections, by pressing and holding down a button for different time periods. Button depression duration diagram 500, shown in FIG. 5, indicates various depression durations for button "3" and the resulting function selection. Depression 501 is brief, less than a second, for example, and results in a "3" being entered for channel selection. Depression 502 has a duration of 1-2 seconds and results in the recall of program "3". This may be, for example, the channel assigned to the number "3" position in the favorite channel list (e.g., channel 2 in program lineup 400). To recall a program from a two-digit channel allocation, which would allow a maximum of 99 channels, a user would press x3, where "x" in this case refers to the digits in the tens position of the channel selection. In this case, for example, "x" is the number 2. Thus to select quick-access number 23, the viewer would press the number 2 briefly and then the number 1 for a longer duration (e.g., 1-2 seconds).

Depression 503 has a duration of 3-4 seconds and results in an update to the program "3". Such an update may be used to store a current channel into the program number "3" of the favorite channel list. For example if the system is currently tuned to channel 4 and the "3" is depressed for a duration of 3-4 seconds, then the number "3" position of the favorite program list will be updated with channel 4 (i.e., channel 4 will replace channel 7 in program lineup 400). Depression 504 has a duration of more than 5 seconds and results in program "3" being cleared and resetting memory. For example the number "3" position of the favorite channels list would be vacant. Alternatively, this feature could be implemented in such a manner that all programs with a higher number would, after the deletion (e.g., by adding a special command, or as a default), be decremented by one. Either or both implementation methods could be a fixed feature, or, alternatively, they could be user-selectable.

In alternative embodiments, a number of functions may be selected by corresponding depressions of various durations. It will be appreciated that there are numerous possible implementations for single-button access to multiple functions of a multimedia presentation system in accordance with alternative embodiments of the present invention.

For one embodiment, the programming feature described above in reference to FIG. 5, requests user confirmation prior to clearing. For example, the system may display a query (e.g., "Do you want to clear program?"). Such a query may be accompanied by directions to press particular buttons to indicate yes or no, and if yes, how to restructure the program list upon clearing. Additionally, a user may insert a program at, for example, a particular program number. Such a function may be activated by holding down a button for yet another duration in the time-mode switch, or, in some cases, by pressing a "special key" before pressing the number key. When a program is thus inserted, it would push up all of the higher numbered programs by one.

In alternative embodiments, a number of functions may be selected by corresponding depressions of various durations. Also, the channel up and down buttons could be used to select channels, programs, SmartGuide™, etc., depending on the selected mode. Modes could be readily changed by pressing the channel up or down button for an extended period of time (for example, 2 seconds).

For one embodiment, the single-button access to multiple functions of a multimedia presentation system, through varying button depression duration, may be used to enhance the "last channel" feature. Typically, the "last channel" button allows a viewer to switch between two channels: the channel presently being viewed and the channel last viewed. But no shortcut method is available in current art that permits a viewer to switch among three or more channels. In accordance with one embodiment of the present invention, the "last channel" button could be programmed to switch among the last one, two, three, or more channels previously viewed, by depressing the previous channel button for various durations. For one such embodiment the number of previous channels that are accessible is a specified maximum, for example, 10 channels. Upon reaching the maximum number of previous channels, the button could then revert back to switch to just one previously viewed channel, or it could decrement the number of previous channels in the selection rotation sequentially back down to one.

For one embodiment the button depression duration and corresponding function are displayed on the television screen. This eliminates the need for the user to accurately estimate the button depression duration. In some cases, it may be shown on an auxiliary screen (not shown), such as a Web tablet, or a remote control based screen, or other secondary screens or indicators (i.e. LEDs) available.

Figure 6:
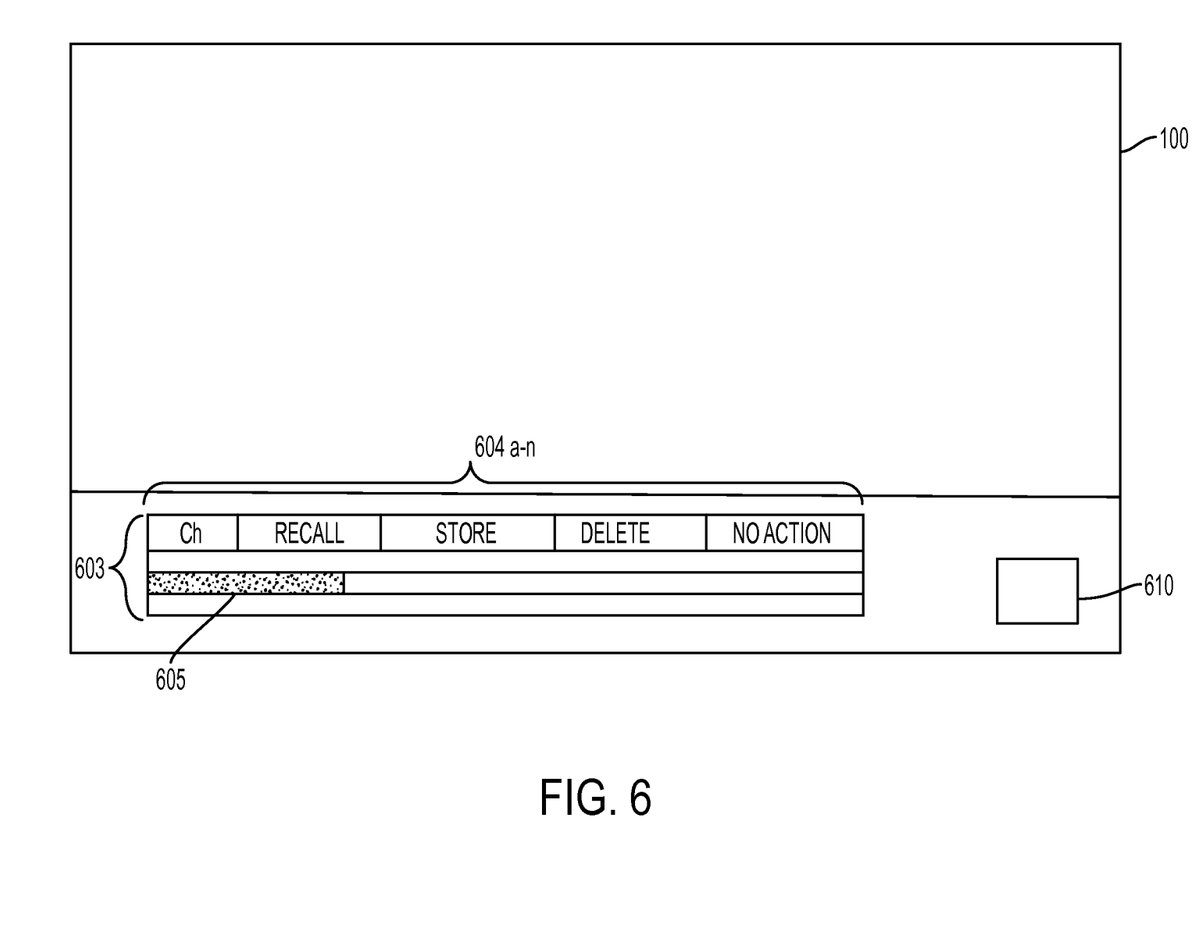
FIG. 6 illustrates a display indicating depression duration and corresponding function in accordance with one embodiment of the present invention.

FIG. 6 illustrates a display indicating depression duration and corresponding function in accordance with one embodiment of the present invention. FIG. 6 shows screen 200 with an overlay 601 containing a bar system 602 comprising a framework 603 with labels 604a-604n, and a progression bar 605 that moves inside from one function to another in the boxes. As the viewer releases the button while the bar 604 is in the recall box, it would recall, for example, function 1. Additionally, further information may be shown. Indicia 610 show which function would be activated once the recall is finished. For example, indicia 610 may indicate that it has tuned to program 1, which is channel 7 in this example.

In alternative embodiments, other displays may be shown, such displays may be superimposed or may be in the background, or they may be on a semitransparent banner, or on some other type of image. Such displays may also be in any type of image and position. Instead of bars, for example, a clock may be used, because of the progress of time. In such a clock, the time sweeps across the clock face, with each sector of the clock having a different function. Or, for example, for children, a Mickey Mouse head may count the progress of time and, for example, each second may be four Mickey Mouse heads, with a variety of different colors indicating the various functions.

There are many other methods and types of displays, as well as methods for acknowledgment of user actions and selections (including, but not limited to, optional audible acknowledgment such as, for example, a beep or chime).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
receiving an indication of a depression of a button on a multimedia presentation device controller;
receiving an indication of an ending of the depression of the button;
evaluating a depression duration of the button and classifying the depression duration into one of three or more ranges, wherein a first depression duration range is associated with a first function on the multimedia presentation device controller, a second depression duration range is associated with a second function on the multimedia presentation device controller, and a third depression duration range is associated with a third function on the multimedia presentation device controller, and wherein a final depression duration after the three or more depression duration ranges is associated with a termination function that does not perform any of the button functions on the multimedia presentation device controller; and
performing the function associated with the depression duration range of the button on the multimedia presentation device controller.

2. The method of claim 1, wherein the button corresponds to a channel up button or a channel down button, wherein the first depression duration range is associated with a function for tuning an associated multimedia presentation device to a different broadcast channel, and wherein the second or third depression duration range is associated with a function for changing an operating mode of the multimedia presentation device.

3. The method of claim 1, wherein the button corresponds to a last channel button, wherein the first depression duration range is associated with a function for tuning an associated multimedia presentation device to a most recently previously viewed channel, and wherein the second duration range is associated with a function for tuning the multimedia presentation device to a channel viewed before the most recently previously viewed channel.

4. The method of claim 1, wherein after receiving the indication of the depression and before receiving the indication of the ending of the depression, the depression duration corresponds to a progress bar with range labels displayed on an associated multimedia presentation device.

5. The method of claim 1, wherein the button is a channel selection number button (0-9), and wherein the first, second, and third depression duration ranges of the channel selection number button (0-9) are associated with three different functions on the multimedia presentation device controller relating to the channel selection number button (0-9).

6. The method of claim 5, wherein performing the function associated with the depression duration range of the button on the multimedia presentation device controller comprises:
  when determining that the depression duration of the channel selection number button (0-9) corresponds to the first depression duration range, entering the number of the channel selection number button (0-9) for a channel selection function; and
  when determining that the depression duration of the channel selection number button (0-9) corresponds to the second or third depression duration range, performing one of a plurality of functions on a favorite channels list, wherein the function performed comprises one of accessing, programming, updating, or clearing the item number in the favorite channels list corresponding to the channel selection number button (0-9), wherein the function performed is based upon the determined depression duration range.

7. A multimedia presentation device controller comprising:
  a processor having a memory coupled thereto, the memory having stored thereon computer executable instructions which, when executed by the processor, cause the multimedia presentation device controller to:
    receive an indication of a depression of a button on the multimedia presentation device controller;
    receive an indication of an ending of the depression of the button;
    evaluate depression duration of the button and classifying the depression duration into one of three or more ranges, wherein a first depression duration range is associated with a first function on the multimedia presentation device controller, a second depression duration range is associated with a second function on the multimedia presentation device controller, and a third depression duration range is associated with a third function on the multimedia presentation device controller, and wherein a final depression duration after the three or more depression duration ranges is associated with a termination function that does not perform any of the button functions on the multimedia presentation device controller; and
    perform the function associated with the depression duration range of the button on the multimedia presentation device controller.

8. The multimedia presentation device controller of claim 7, wherein the button corresponds to a channel up button or a channel down button, wherein the first depression duration range is associated with a function for tuning an associated multimedia presentation device to a different broadcast channel, and wherein the second or third depression duration range is associated with a function for changing an operating mode of the multimedia presentation device.

9. The multimedia presentation device controller of claim 7, wherein the button corresponds to a last channel button, wherein the first depression duration range is associated with a function for tuning an associated multimedia presentation device to a most recently previously viewed channel, and wherein the second duration range is associated with a function for tuning the multimedia presentation device to a channel viewed before the most recently previously viewed channel.

10. The multimedia presentation device controller of claim 7, wherein after receiving the indication of the depression and before receiving the indication of the ending of the depression, the depression duration corresponds to a progress bar with range labels displayed on an associated multimedia presentation device.

11. The multimedia presentation device controller of claim 7, wherein the button is a channel selection number button (0-9), and wherein the first, second, and third depression duration ranges of the channel selection number button (0-9) are associated with three different functions on the multimedia presentation device controller relating to the channel selection number button (0-9).

12. The multimedia presentation device controller of claim 11, wherein performing the function associated with the depression duration range of the button on the multimedia presentation device controller comprises:
  when determining that the depression duration of the channel selection number button (0-9) corresponds to the first depression duration range, entering the number of the channel selection number button (0-9) for a channel selection function; and
  when determining that the depression duration of the channel selection number button (0-9) corresponds to the second or third depression duration range, performing one of a plurality of functions on a favorite channels list, wherein the function performed comprises one of accessing, programming, updating, or clearing the item number in the favorite channels list corresponding to the channel selection number button (0-9), wherein the function performed is based upon the determined depression duration range.

13. One or more non-transitory computer-readable media containing instructions which, when executed by a processor, cause the processor to perform:
  receiving an indication of a depression of a button on a multimedia presentation device controller;
  receiving an indication of an ending of the depression of the button;
  evaluating a depression duration of the button and classifying the depression duration into one of three or more ranges, wherein a first depression duration range is associated with a first function on the multimedia presentation device controller, a second depression duration range is associated with a second function on the multimedia presentation device controller, and a third depression duration range is associated with a third function on the multimedia presentation device controller, and wherein a final depression duration after the three or more depression duration ranges is associated with a termination function that does not perform any of the button functions on the multimedia presentation device controller; and
  performing the function associated with the depression duration range of the button on the multimedia presentation device controller.

14. The method of claim 1, wherein said evaluating comprises classifying the depression duration into one of four or more ranges, and wherein a fourth depression duration range is associated with a fourth function on the multimedia presentation device controller.

15. The multimedia presentation device controller of claim 7, wherein said evaluating comprises classifying the depression duration into one of four or more ranges, and wherein a fourth depression duration range is associated with a fourth function on the multimedia presentation device controller.

16. The non-transitory computer-readable media of claim 13, wherein the button corresponds to a channel up button or a channel down button, wherein the first depression duration range is associated with a function for tuning an associated multimedia presentation device to a different broadcast channel, and wherein the second or third depression duration range is associated with a function for changing an operating mode of the multimedia presentation device.

17. The non-transitory computer-readable media of claim 13, wherein the button corresponds to a last channel button, wherein the first depression duration range is associated with a function for tuning an associated multimedia presentation device to a most recently previously viewed channel, and wherein the second duration range is associated with a function for tuning the multimedia presentation device to a channel viewed before the most recently previously viewed channel.

18. The non-transitory computer-readable media of claim 13, wherein after receiving the indication of the depression and before receiving the indication of the ending of the depression, the depression duration corresponds to a progress bar with range labels displayed on an associated multimedia presentation device.

19. The non-transitory computer-readable media of claim 13, wherein said evaluating comprises classifying the depression duration into one of four or more ranges, and wherein a fourth depression duration range is associated with a fourth function on the multimedia presentation device controller.

20. The non-transitory computer-readable media of claim 13, wherein the button is a channel selection number button (0-9), and wherein the first, second, and third depression duration ranges of the channel selection number button (0-9) are associated with three different functions on the multimedia presentation device controller relating to the channel selection number button (0-9).

21. The non-transitory computer-readable media of claim 20, wherein performing the function associated with the depression duration range of the button on the multimedia presentation device controller comprises:
    when determining that the depression duration of the channel selection number button (0-9) corresponds to the first depression duration range, entering the number of the channel selection number button (0-9) for a channel selection function; and
    when determining that the depression duration of the channel selection number button (0-9) corresponds to the second or third depression duration range, performing one of a plurality of functions on a favorite channels list, wherein the function performed comprises one of accessing, programming, updating, or clearing the item number in the favorite channels list corresponding to the channel selection number button (0-9), wherein the function performed is based upon the determined depression duration range.

\* \* \* \* \*